United States Patent
Waasmaier et al.

(10) Patent No.: US 8,874,464 B2
(45) Date of Patent: Oct. 28, 2014

(54) IMPLEMENTATION OF BUSINESS MODELS IN A COMPLEX RUNTIME SYSTEM LANDSCAPE

(75) Inventors: Daniel J. Waasmaier, Ladenburg (DE); Michael P. Ihle, Forst (DE)

(73) Assignee: SAP AG, Walldorf (DE), `

( * ) Notice: Subject to any disclaimer, the term of this patent is extended or adjusted under 35 U.S.C. 154(b) by 1276 days.

(21) Appl. No.: 12/275,938

(22) Filed: Nov. 21, 2008

(65) Prior Publication Data
US 2010/0131320 A1 May 27, 2010

(51) Int. Cl.
*G06Q 10/00* (2012.01)
*G06Q 10/06* (2012.01)
(52) U.S. Cl.
CPC ............ *G06Q 10/06* (2013.01); *G06Q 10/0637* (2013.01)
USPC ............................................................ 705/8

(58) Field of Classification Search
USPC ........ 705/8, 16, 21, 59, 71; 380/44, 262, 278, 380/279
See application file for complete search history.

(56) References Cited

U.S. PATENT DOCUMENTS

| 2004/0122869 A1* | 6/2004 | Muehl et al. .................. 707/201 |
| 2005/0021348 A1* | 1/2005 | Chan et al. ......................... 705/1 |
| 2006/0224702 A1* | 10/2006 | Schmidt et al. ............... 709/219 |
| 2008/0201608 A1* | 8/2008 | Forhan et al. ................... 714/15 |

* cited by examiner

*Primary Examiner* — Dante Ravetti
(74) *Attorney, Agent, or Firm* — Blakely Sokoloff Taylor & Zafman LLP

(57) ABSTRACT

A system for adding an additional business model to an existing productive runtime system landscape is described. An additional business model is implemented on an existing productive system landscape that includes an existing business model. The productive system is maintained independently from the implementing of the additional business model on the existing productive system landscape. The additional business model is deployed in the existing business model combined within the existing productive system landscape.

15 Claims, 2 Drawing Sheets

IMPLEMENTATION OF BUSINESS MODELS IN A COMPLEX RUNTIME SYSTEM LANDSCAPE

FIELD

Embodiments relate to business systems and more particularly to the implementation of new business models in complex runtime system landscapes.

BACKGROUND

An important issue in software implementation/architecture is how to deal with a complex runtime system landscape. To maintain business needs, companies frequently set up different systems within a system landscape for development, consolidation/test, and production. It is also common for companies to implement a new business model with a long project runtime. Problems arise if implementation of a new business model takes place in parallel to an already existing model already being used in production.

Thus, companies frequently use a dual system landscape to eliminate risks on production caused by mutual impact between a new business model implementation and maintenance of existing business models. On one hand, companies want to separate the new implementations from maintenance to avoid negative side effects on production. On the other hand, companies are averse to additional different system landscapes for costs/economy reasons.

SUMMARY OF THE DESCRIPTION

A system for adding an additional business model to an existing productive runtime system landscape is described. An additional business model is implemented on an existing productive system landscape that includes an existing business model. The productive system is maintained independently from the implementing of the additional business model on the existing productive system landscape. The additional business model is deployed in the existing business model combined within the existing productive system landscape.

BRIEF DESCRIPTION OF DRAWINGS

The following description includes discussion of figures having illustrations given by way of example implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

As provided herein, methods, apparatuses, and systems enable implementation of business models on an existing productive system landscape without disrupting existing business models. As used herein, a business model refers to the data, metadata and/or programming framework embodied by a business process and can include, but is not limited to, business organizational structures, business partners and incentive plans. A business model may also define sales projects, commission processing, sales order processing, contract processing, incentive processing, incentive results reporting, and the like.

Figure 1:
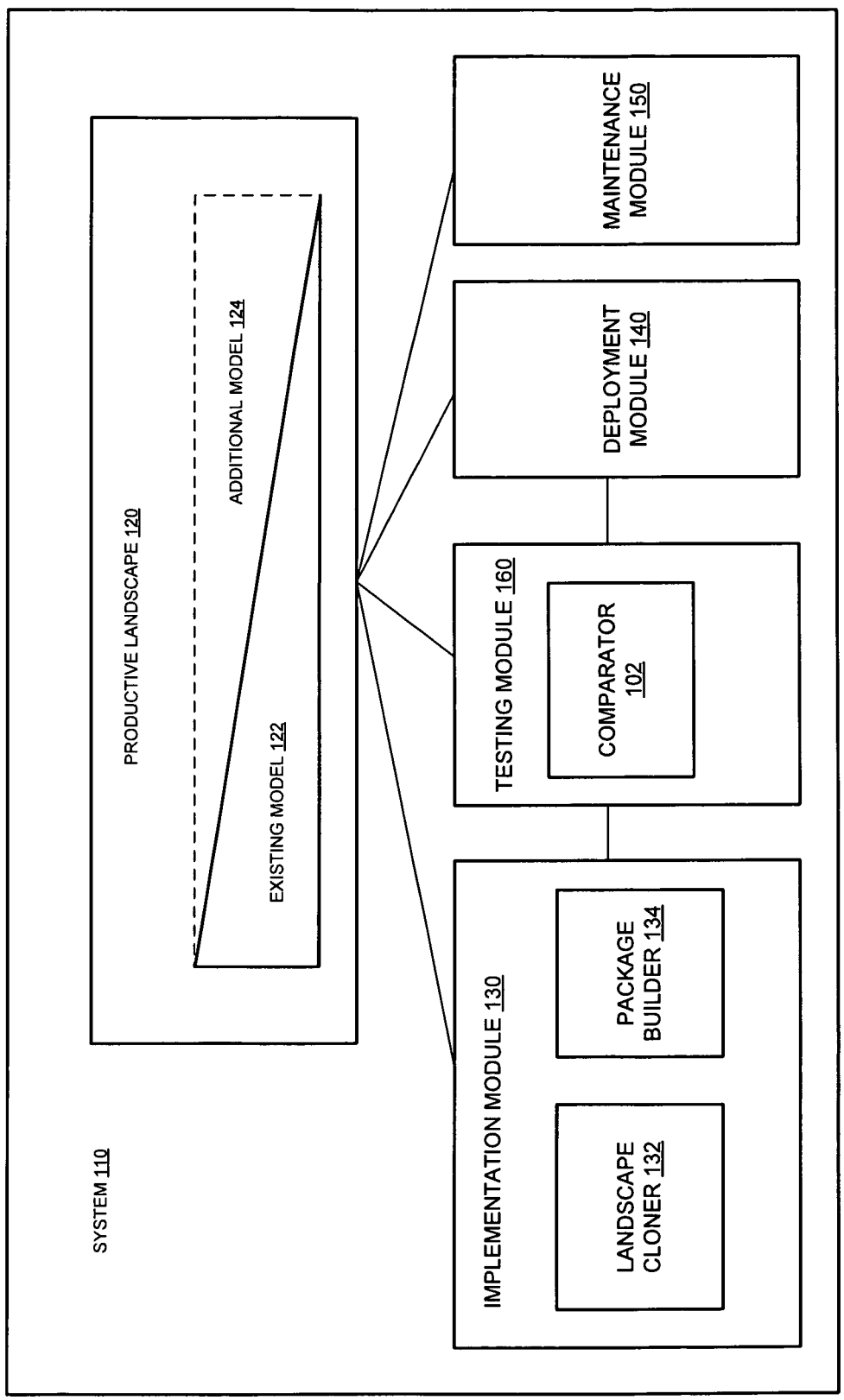
FIG. 1 is a block diagram illustrating a system according to various embodiments.

FIG. 1 is a block diagram illustrating a system according to various embodiments. As shown, system 110 can be representative of any type or combination of business systems. For example, system 110 could be an Incentive and Commission Management (ICM) system similar to the one offered for sale by SAP AG of Waldorf, Germany. Any type of system that can incorporate/combine multiple business models together is contemplated by embodiments described herein. In such systems, implementation of a new business model onto an existing productive system landscape presents various challenges.

To avoid disrupting existing business models and services, many companies/organizations implement new business models by creating a second or parallel productive system which can be a considerable cost. Embodiments described herein are designed to facilitate implementation of the new business model onto an existing productive system landscape without incurring the cost of creating a second productive system while maintaining the stability of existing business models running on the existing system landscape.

As shown in FIG. 1, system 110 includes a productive landscape 120 where existing business models, such as existing model 122, operate. System 110 also includes an implementation module 130, deployment module 140, and testing module 160 to facilitate implementation of an additional business model 124. Additional model 124 may be a new business model in various embodiments. However, additional business model 124 could also be a business model that is not currently in use on productive landscape 120. Hence, any business model that is to be added to productive landscape 120 can be considered an additional business model in various embodiments.

It should be noted that existing model 122 can be representative of multiple existing models running on productive landscape 120. It should also be noted that existing model 122 is maintained by maintenance module 150 independent of any implementation of any new or additional model, such as additional model 124. In other words, the function and operation of existing model 122 is not negatively impacted by the implementation of additional model 124 (perhaps with the exception of minor system performance speed issues, etc.).

Implementation module 130 includes a landscape cloner 132 and a package builder 134. Landscape cloner 132 generates snapshots of the existing productive system landscape. In other words, landscape cloner 132 copies, for example, existing model 122 (referred to herein as a "snapshot") and brings that snapshot into implementation module 130. Package builder 134 modifies the snapshot taken by landscape cloner 132 to include the additional model 124. In various embodiments, landscape cloner 132 actually takes multiple (e.g., 2) snapshots of existing model 122. One of the snapshots is used by package builder 134 to implement additional model 124. In other words, package builder 134 modifies the snapshot, incorporating the functionality of additional model 124 into the snapshot. Thereafter, the unmodified snapshot can be "subtracted" from the modified snapshot to determine a delta value.

In embodiments that use multiple snapshots, landscape cloner 132 may generate the multiple snapshots simultaneously or the multiple snapshots may be generated at different points in time. The multiple snapshots can be taken directly from existing model 122 on productive landscape 120 or a first snapshot could be taken directly from existing model 122 and a second snapshot could be generated by copying the first snapshot.

Testing module 160 tests snapshots modified by package builder 134 to ensure proper functionality, etc. Testing module 160 may include a variety of testing tools known to those skilled in the art. In embodiments where multiple snapshots are generated by landscape cloner 132, a comparator 102 compares, for example, an unmodified snapshot to a modified snapshot generated by package builder 134. Based on the comparison, comparator 102 identifies a delta. As used herein, "delta" refers to differences (e.g., programming/code differences) between the modified snapshot and the unmodified snapshot. By identifying a delta, deployment module 140 can then take that delta and deploy it directly onto productive landscape 120. The delta effectively sits on top of existing model 122 and represents additional model 124. Initial deployment may take place with productive landscape 120 in a development mode that does not impact the performance of existing model 122. Testing module 160 then tests existing model 122 and additional model 124 (e.g., the delta) together in productive landscape 120. If the test fails, additional module 124 is removed from productive landscape 120 without affecting or impacting existing model 122.

Once additional model 124 has been debugged, it can then be redeployed by deployment module 140 and the combined models (122 and 124) can be retested by testing module 160. This process of testing and debugging can be iterated as many times as necessary to achieve proper functionality. Additionally, package builder 134 can rebuild or regenerate additional model 124 as needed.

Once additional model 124 has been tested (both separately and in combination with existing model 122) successfully, productive landscape 120 runs existing model 122 and additional model 124 together in productive mode.

Maintenance module 150 continually maintains productive landscape 120. In particular, maintenance module 150 may perform maintenance on existing model 122 during the time in which implementation model 130 generates additional business models, testing module 160 performs testing, etc. In various embodiments, maintenance module 150 may maintain models (e.g., existing model 122 and additional model 124) separately; however, maintenance module 150 may also provide maintenance to everything in the productive system landscape 120 together (e.g., based on the combination of existing model 122 and additional model 124).

Figure 2:
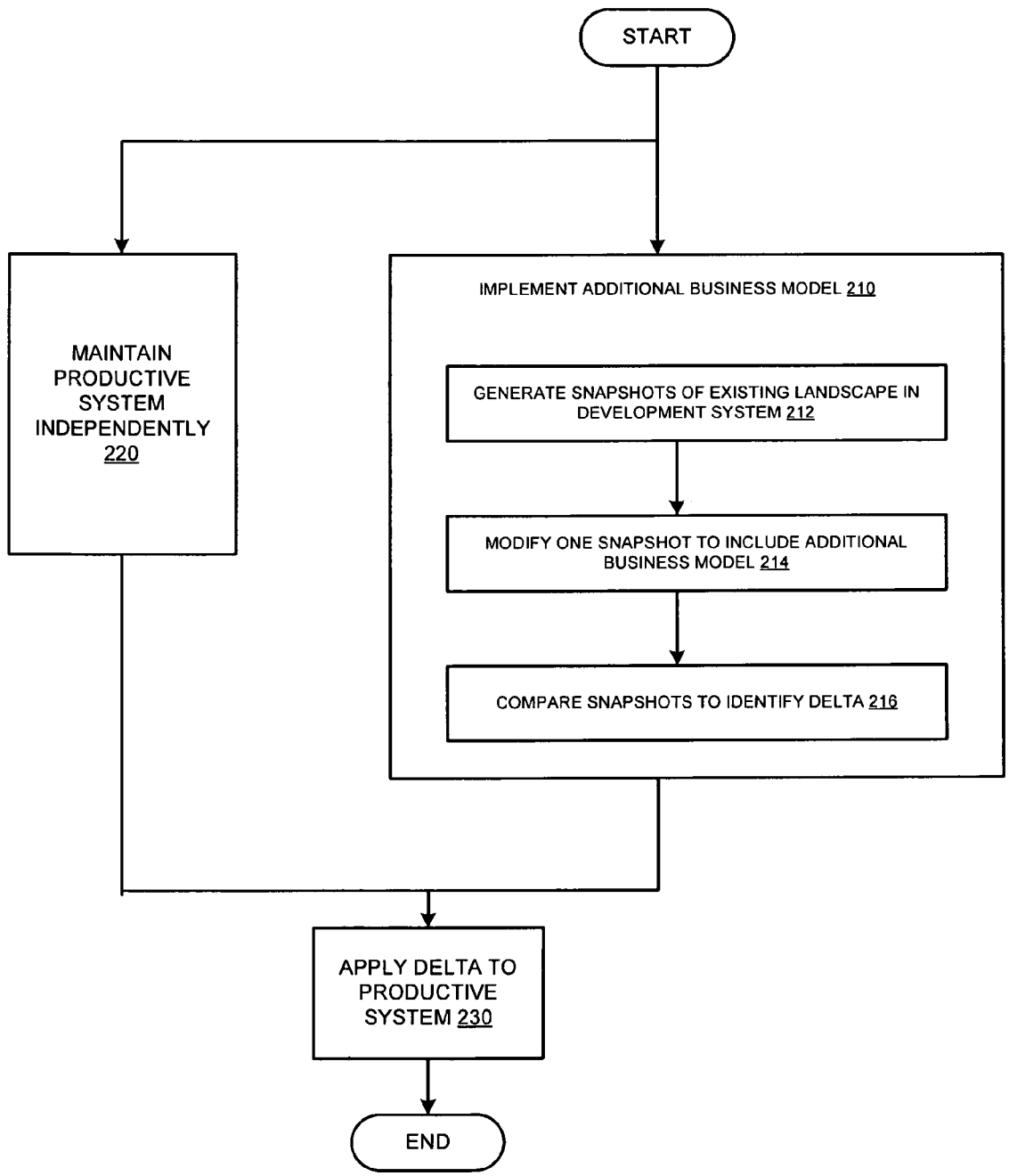
FIG. 2 is a flow diagram of operation in a system according to various embodiments.

FIG. 2 is a flow diagram of operation in a system according to various embodiments. An additional business model is implemented 210 on an existing productive system landscape that includes an existing business model. In parallel, the existing productive system is independently maintained 220. In other words, the implementation of the additional business model does not interfere with maintenance of any existing business models in the productive system. The implementation of the additional business model 210 includes generating snapshots of the existing system landscape 212. Any number of snapshots can be generated in various embodiments; however, in certain embodiments, two snapshots of the existing system landscape are generated. A snapshot, as used herein, can be a copy of one or more existing business models and/or a copy of the framework that supports any existing business models. In other words, a snapshot is a nonfunctioning copy of the existing business models and/or system landscape. In various embodiments, snapshots are generated in a development system (e.g., a sub-system of the business system that is separate and/or distinct from the productive system or sub-system).

At least one of the snapshots is modified to include the additional business model 214. In some embodiments, where multiple snapshots (i.e., more than 2) are generated, more than one snapshot can be modified to include an additional business model. In such embodiments, the only necessity is that a least one snapshot remains unmodified. Any modified snapshots may be tested to verify functionality, compatibility, etc. Any issues that arise in testing are resolved before proceeding with implementation.

Once the new implementation (e.g., the new and/or additional business model) has been tested and/or verified, the one or more modified snapshots are compared against an unmodified snapshot to identify a system or model delta 216. The delta represents the portion of repository objects (code and/or data dictionary) and/or customizing data that has been added or changed as compared to the original unmodified snapshot of the existing business models.

Once the additional business model has been implemented and the delta has been determined, the delta may be applied to the productive system 230. In other words, the additional business model may be deployed onto the existing implementation of the system landscape. Further testing may occur on the combined system landscape that now includes the additional business model. If any errors, bugs, or other problems arise during testing, the additional business model can be removed and fixed and retested. This process of testing and debugging can be iterated multiple times, as needed.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program which may be transferred from a memory on a remote computer (e.g., a server) to a memory on a requesting computer (e.g., a client).

Various components described herein may be a means for performing the functions described herein. Each component described herein includes software, hardware, or a combination of these. The operations and functions described herein can be implemented as software modules, hardware modules, special-purpose hardware (e.g., application specific hardware, application specific integrated circuits (ASICs), digital signal processors (DSPs), etc.), embedded controllers, hardwired circuitry, etc.

Aside from what is described herein, various modifications may be made to the disclosed embodiments and implementations of the invention without departing from their scope. Therefore, the illustrations and examples herein should be construed in an illustrative, and not a restrictive sense.

What is claimed is:

1. A method performed by a computer, the computer including a processor coupled to a memory, the method comprising:

implementing, by the computer, an additional business model on an existing productive system landscape having an existing business model, the implementing of the additional business model comprising:

generating, by the computer, a first snapshot and a second snapshot of the existing productive system landscape;

wherein the first and second snapshots are copies of the existing productive system landscape;

modifying, by the computer, the second snapshot after generation of the second snapshot to include the additional business model; and comparing, by the computer, the modified second snapshot with the first snapshot;

identifying, by the computer, a delta between the second and first snapshot;

maintaining, by the computer, the existing business model in the existing productive system landscape independently from the implementing of the additional business model on the existing productive system landscape;

applying, by the computer, the identified delta to the existing productive system; and deploying, by the computer, the additional business model and the existing business model together within the existing productive system landscape.

2. The method of claim 1, further comprising:

performing maintenance on the additional business model independent of other business models running on the system landscape.

3. A non-transitory machine-accessible storage medium having stored therein a set of instructions that, when executed by a processor, cause the processor to perform the steps of:

implementing an additional business model on an existing productive system landscape having an existing business model, the implementing of the additional business model comprising:

generating a first snapshot and a second snapshot of the existing productive system landscape;

wherein the first and second snapshots are copies of the existing productive system landscape;

modifying the second snapshot after generation of the second snapshot to include the additional business model;

comparing the modified second snapshot with the first snapshot; and identifying a delta between the second and first snapshot;

maintaining the existing business model in the existing productive system landscape independently from the implementing of the additional business model on the existing productive system landscape;

applying the identified delta to the existing productive system; and deploying the additional business model and the existing business model together within the existing productive system landscape.

4. The non-transitory machine accessible storage medium of claim 3, wherein the instructions comprise further instructions to cause the machine to:

perform maintenance on the additional business model independent of other business models running on the system landscape.

5. A system, comprising:

a processor;

non-transitory machine-accessible storage medium having stored therein a set of instructions that, when executed by the processor, cause the processor to perform the steps of:

implementing an additional business model on an existing productive system landscape having an existing business model, the implementing of the additional business model comprising:

generating a first snapshot and a second snapshot of the existing productive system landscape;

wherein the first and second snapshots are copies of the existing productive system landscape;

modifying the second snapshot after generation of the second snapshot to include the additional business model;

comparing the modified second snapshot with the first snapshot; and identifying a delta between the second and first snapshot;

maintaining the existing business model in the existing productive system landscape independently from the implementing of the additional business model on the existing productive system landscape;

applying the identified delta to the existing productive system; and deploying the additional business model and the existing business model together within the existing productive system landscape.

6. The system of claim 5, further comprising:

the hardware implemented maintenance module to perform maintenance on the additional business model independent of other business models running on the system landscape.

7. The method of claim 1, further comprising:

performing testing on the additional business model independent of other business models running on the system landscape.

8. The non-transitory machine accessible storage medium of claim 3, wherein the instructions comprise further instructions to cause the machine to:

perform testing on the additional business model independent of other business models running on the system landscape including the existing business model.

9. The system of claim 5, further comprising:

a testing module to perform testing on the additional business model independent of other business models running on the system landscape including the existing business model.

10. The method of claim 1, wherein more than one snapshot of the existing productive system landscape is modified to represent the additional business model.

11. The method of claim 1, wherein the delta identifies repository objects and customizing data that are new or changed in the additional business model in comparison to the existing business model.

12. The non-transitory machine accessible storage medium of claim 3, wherein more than one snapshot of the existing productive system landscape is modified to represent the additional business model.

13. The non-transitory machine accessible storage medium of claim 3, wherein the delta identifies repository objects and customizing data that are new or changed in the additional business model in comparison to the existing business model.

14. The system of claim 5, wherein more than one snapshot of the existing productive system landscape is modified to represent the additional business model.

15. The system of claim 5, wherein the delta identifies repository objects and customizing data that are new or changed in the additional business model in comparison to the existing business model.

* * * * *